United States Patent [19]

Hansen et al.

[11] 4,405,266
[45] Sep. 20, 1983

[54] DEEP DRILLING MACHINE

[75] Inventors: Willi Hansen; Bernard Kunze; Matthias Hermanns, all of Erkelenz, Fed. Rep. of Germany

[73] Assignee: Wilhelm Hegenscheidt Gesellshaft mbH, Erkelenz, Fed. Rep. of Germany

[21] Appl. No.: 474,272

[22] Filed: Mar. 11, 1983

[30] Foreign Application Priority Data

Sep. 5, 1979 [DE] Fed. Rep. of Germany ....... 2935766

[51] Int. Cl.$^3$ .............. B23B 51/06; B23B 5/00; B27C 9/04
[52] U.S. Cl. .................... 408/56; 82/2 R
[58] Field of Search ............ 408/71, 64, 61, 56, 408/23, 22, 105; 82/2.5, 2 R

[56] References Cited

U.S. PATENT DOCUMENTS

| 103,660 | 7/1872 | Laval et al. | 408/64 |
| 327,160 | 9/1885 | Hackman et al. | 408/56 |
| 493,191 | 3/1893 | Smith | 408/64 |
| 849,414 | 4/1907 | Mueller | 408/62 |
| 2,712,839 | 7/1952 | Harpell et al. | 408/62 |
| 3,502,124 | 3/1970 | Matter | 408/56 |
| 3,796,116 | 3/1974 | Spreitzer | 82/2 R |
| 4,133,089 | 1/1979 | Heymann | 408/56 |

FOREIGN PATENT DOCUMENTS 2208508 8/1973 Fed. Rep. of Germany ........ 408/64

Primary Examiner—Robert E. Gerrett
Assistant Examiner—Paul M. Heyrana, Sr.
Attorney, Agent, or Firm—Arthur B. Colvin

[57] ABSTRACT

The present invention relates to a deep drilling machine including an elongate base, a headstock at one end, a tailstock at the other end, each of the headstock and tailstock being shiftable axially of the base by drive device interposed between the base and each of the headstock and tailstock. A coolant supply apparatus having a chuck member is interposed between the headstock and tailstock at a central position along the base. Devices are provided for enabling the chuck member of the coolant supply devices selectively to face the headstock or the tailstock as desired. The chuck of the headstock is provided with drive device. By the foregoing arrangement a chuck member may be oriented toward the headstock or the tailstock whereby the device may be set up such that either the workpiece or the drilling tool is rotated without the necessity for providing drive device at both the headstock and tailstock ends of the device. Preferably the chuck member is provided with a preload of a hydraulic or spring nature which enables limited axial movement of the chuck member against the preload force.

4 Claims, 5 Drawing Figures

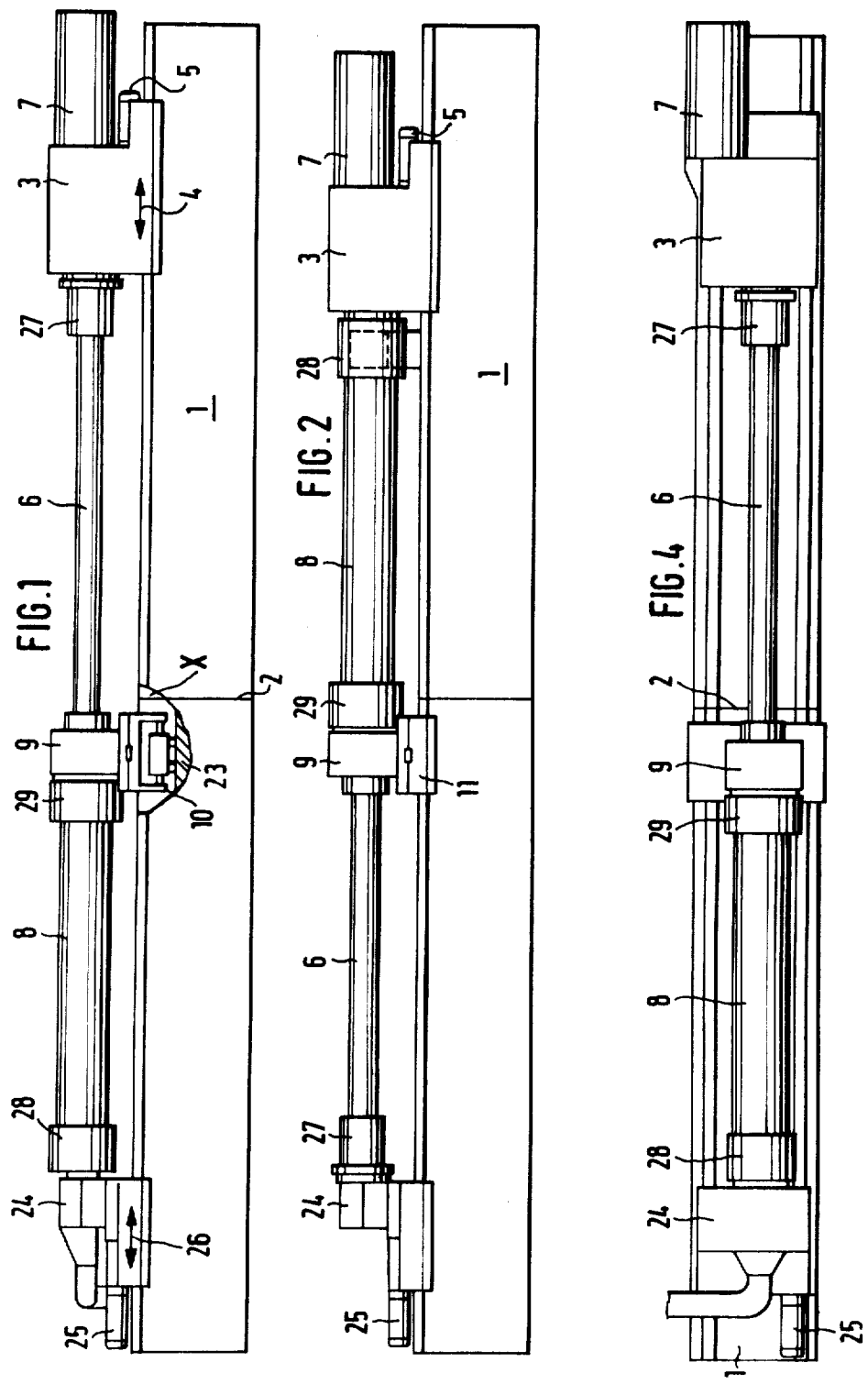

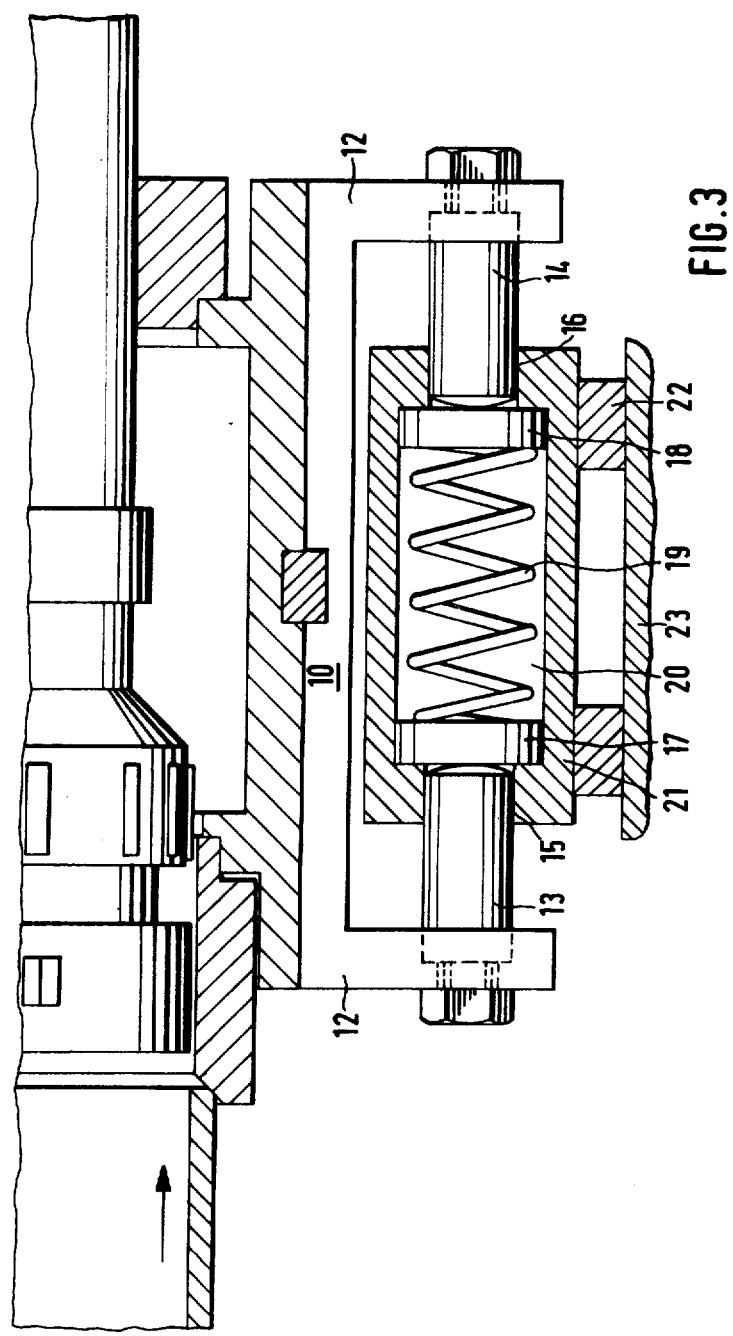

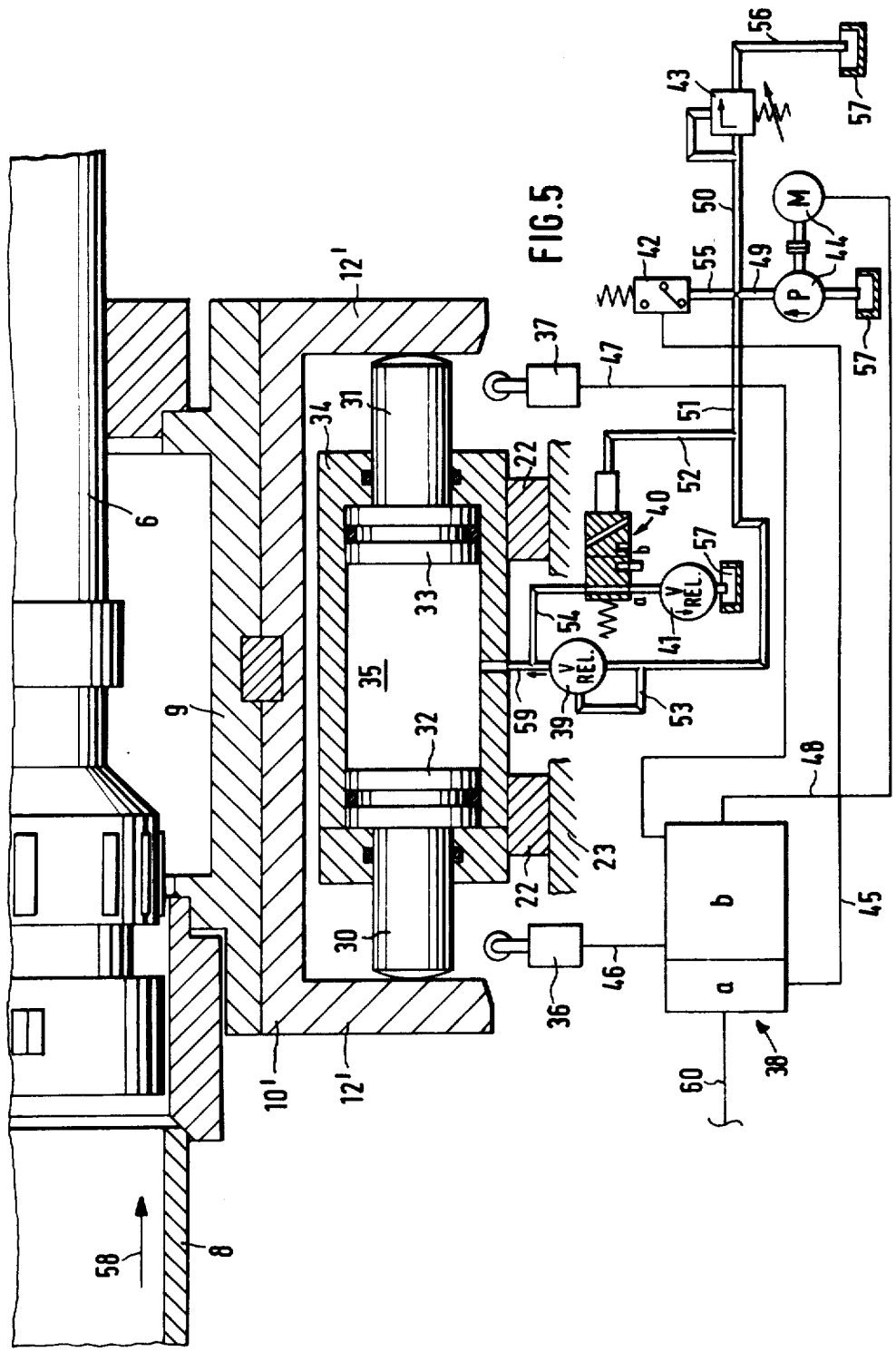

//4,405,266

DEEP DRILLING MACHINE

BACKGROUND OF THE INVENTION

1. Field of the Invention

The invention relates to a deep drilling machine, essentially consisting of a machine base on which is disposed a movable headstock, a tailstock, and between them a coolant supply apparatus. The coolant supply apparatus may also be a drill tube guiding apparatus or serve as such at the same time.

2. The Prior Art

Deep drilling machines of this kind are already known from the not prepublished DE-P No. 29 15 381.9. However, a deep drilling machine according to this patent application is designed for machining a non-rotating workpiece with a rotating tool only. In the presence of certain technological and work-organizational conditions, however, it may be desirable to be able to work selectively with a nonrotating workpiece and a rotating tool or alternatively with a nonrotating tool and rotating workpiece. Machines meeting this requirement have become known, for instance, through the brochure of the Wohlenberg Co., "Deep Drilling, a Highly Productive Production Method," catalog No. WD 2010 D/300973, catalog page 12, Wohlenberg VDF Deep Drilling Machine B 1058. However, the subject machine is built very expensively, and requires a main drive on both the workpiece headstock and the so called tool headstock, including all the gearing control and operating elements associated with a main drive mechanism. Additionally, the Wohlenberg tool requires a feed drive on both the tool headstock and the so called drilling oil supply (cooling) apparatus, the two feed drives having to be different from each other because an elastic member by which the thermal expansion of the workpiece during machining can be compensated must be provided in the feed drive of the drilling oil supply apparatus. Beyond this, the mobility of the drilling oil supply apparatus entails additionally the disadvantages described in the German patent application mentioned.

A deep drilling machine very similar to Wohlenberg has become known from the German Disclosure DE-OS No. 22 08 508. In it, however, the drilling oil supply apparatus is additionally mounted on a movable base, to which it is fastened so as to be shiftable by 180° about a vertical axis. As an alternative, it can also be mounted on a second base.

As may be learned from the brochure No. 9/77 of Gildemeister & Knoll GmbH "Deep Drilling Machine Type 84," page 1, bottom of left column, it is known furthermore to equip the spindle end on both the headstock and tailstock with the same standard seating means for the convenient accommodation of commercial chucking devices. (Seating means according to DIN 55 0 21 Gr. 11).

SUMMARY OF THE INVENTION

It is an object of the invention to provide a deep drilling machine of simple design which selectively permits working with rotating tool and nonrotating workpiece, or with rotating workpiece and nonrotating tool.

According to the invention, this problem is solved in that the tailstock and the headstock are equipped with a feed drive each for enabling movement thereof axially of the machine base and that the coolant supply apparatus is fixed on the machine base, in such manner that at least the workpiece chucking device of the coolant supply apparatus is selectively transferable to either of the two operating sides of the coolant supply apparatus.

In further development of the invention it is proposed that the coolant supply apparatus be disposed, in a manner known per se, on a base and be shiftable on it by 180° about a vertical center axis, the workpiece chucking device being mounted so as to be fixed relative to the coolant supply apparatus. Depending on the size of the machine, it may be simpler, under circumstances, to dispose the entire coolant supply apparatus on one base and to mount it thereon so as to be pivotable and lockable or shiftable.

According to another embodiment of the invention it is proposed that the coolant supply apparatus or its base be disposed so as to be movable about a center position against a preload. Due to this measure, the elastic member usually contained in the feed drive to compensate for thermal expansion, can be omitted. It is loaded with the feed drive against the preload of the coolant supply apparatus, and the opportunity provided for the coolant supply apparatus to deflect against the preload makes possible the absorption of the thermal expansion of the workpiece during machining. At the same time, this makes it possible to achieve a rigid clamping of the workpiece against the tool feed force so that errors caused by the workpiece lifting slightly off the centering surface during the machining operation due to the feed force are reliably prevented.

The invention will now be explained in greater detail with reference to the annexed drawing, in which:

FIG. 1 is the front view of a deep drilling machine set up for machining with rotating tool and fixed workpiece;

FIG. 2 is the front view of a deep drilling machine set up for machining with rotating workpiece and fixed tool;

FIG. 3 is a fragmentary magnified vertical section through the mount for the coolant supply;

FIG. 4 is a top plan view of a deep drilling machine in the arrangement per FIG. 1 and FIG. 5 is a view similar to FIG. 3 of an alternate embodiment.

Disposed on a machine base 1 is a headstock 3 which can be moved, in a manner known per se, in the direction of arrow 4 by the feed motor 5. The headstock 3 receives the drilling tube 6 and causes it to rotate through the drive motor 7. As is known, the drilling tube 6 can be moved while rotating by the headstock 3 in the direction of arrow 4. At its other end the drilling tube 6 supports a tool, not detailed here, but known per se, for machining the inside of workpiece 8. The drilling tube 6 is guided by coolant supply apparatus 9. By means of a base 10, 10', respectively, or as an alternative by means of a base 11 (FIG. 2), the coolant supply apparatus 9 is connected to the machine base 1. While the base 11 is clamped to the machine base 1, the base 10, 10', respectively, can be moved from a center position against the resistance of a preload. To accomplish this, the base 10, for instance, may slide freely on the machine base 1. At its end facing the headstock and the tailstock, the base 10 has a bracket 12 each, each being joined to a piston rod 13, 14, respectively, which extends in the direction of elongation of the machine base 1. When the base 10 is in its center position, the piston rods 13 and 14, guided in pilot holes 15 and 16 of a cylinder housing 21, are in contact with the pistons 17 and 18 which are disposed in the cylinder chamber 20 and preloaded by a spring 19. The cylinder housing 21 is fastened by suitable fastening means 22 to the machine base 1, such as on a horizontal rib 23. The preload of the spring 19 suffices to absorb the tension with which the workpiece 8 is being pushed against the coolant supply apparatus 9 while being chucked. If a force greater than this occurs, perhaps due to thermal expansion of the workpiece 8, the coolant supply apparatus 9, and hence the base 10, can be moved by the amount of the thermal expansion, against the force of spring 19. When this happens, the piston rod 13 enters the cylinder chamber 20 and necessarily must move the piston 17 loaded by the spring 19. The sequence of motions just described is possible also in the opposite direction. When the displacing force is removed, the coolant supply apparatus 9 returns to its central position and remains there.

This principle of the "captive spring" according to FIG. 3 which permits movement of the coolant supply apparatus 9 out of its center position selectively in the one or the other direction only by overcoming a preload force, offers special advantages whenever, for example, all workpieces 8 of a big lot are to be chucked always with the same tension. But when it is necessary to work with constantly changing tension, an hydraulic variation of the captive spring principle according to FIG. 5 offers better possibilities. According thereto, brackets 12' of the base 10' rest against the ends of the piston rods 30 and 31. The piston rods 30 and 31 are connected to pistons 32 and 33, located in a cylinder changer 35 of cylinder housing 34 common to both. The cylinder housing 34 is fastened to a horizontal rib 23 of the machine base by the fastening means 22 already described. The base 10' is movable on the machine base 1 in the same manner as base 10 already described. Now, if a tensile force transmitted by the workpiece 8 occurs, it will move the base 10' in the direction of arrow 58. But this also causes the bracket 12' to move which, in turn, pushes the piston rod 30 in the same direction, and hence the piston 32 in the direction of arrow 58 into the cylinder chamber 35. The hydraulic fluid displaced thereby can drain into the tank 57 through the lines 59 and 54, the three-way valve 40 which is in the a position, and the spring-loaded check valve 41. Escape of the fluid in a different direction is prevented by the unlockable check valve 39 which is closed in this situation. Due to the motion of bracket 12' in the direction of arrow 58, the bracket 12' actuates the limit switch 36 which transmits, via the control lead 46, an appropriate signal to part b of the machine control unit 38. For the opposite direction of motion, such a control signal would be transmitted by the limit switch 37 via the control line 47. As soon as the signal from a limit switch 36, 37, respectively, is received by the machine control unit 38, the latter activates, via the control lead 48, the motor 44 of a hydraulic pump. This causes hydraulic fluid to flow through the lines 49 and 51, the unlockable check valve 39, and line 59 into the cylinder chamber 35. Hydraulic fluid also flows through the line 52, used as control line, whereby the three-way valve 40 is switched into the b position so that the line 54 is now blocked. A pressure relief valve 43, acted upon through the line 50, sees to it that the desired back pressure is not exceeded. The pressure relief valve 43 is connectecd to the tank 57 through the line 56. Moreover, a pressure switch 42 is connected to the hydraulic system through the line 55. As soon as the desired back pressure is reached, the pressure switch 42 responds and transmits, via the control lead 45, a control signal to part a of the machine control unit 38. The latter now stops, via the control line 60, the feed drive respectively used as chucking drive. Since the feed drive of such machines is of mechanical nature and self-locking so that no motion of the headstock or tailstock is possible when the feed drive is shut off, the chucking force depends exclusively on the set hydraulic pressure. Now, if thermal expansion occurs in the workpiece 8, it must be absorbed by deflection of the base 10'. This is accomplished in that, with the pump operating, hydraulic fluid can be pushed back into the tank 57 from the cylinder chamber 35 through the lines 59, 51 and 50, the pressure relief valve 43 and the line 56. The hydraulic pressure active on the pump side sees to it that the unblockable check valve 39 is always kept open through the control line 53. If the pump pressure fails for any reason, the unblockable check valve 39 closes so that an unintentional loosening of the workpiece 8 cannot occur. The necessary minimum pressure is then maintained by the spring-preloaded check valve 41.

The machine base 1 which can be separated at the joint 2 for the insertion of extenders, supports on the other side of the coolant supply apparatus a tailstock 24 which is movable in the direction of arrow 26 by the feed motor 25. By moving the tailstock 24 in the direction of the coolant supply apparatus 9 the workpiece 8 is chucked between tailstock 24 and coolant supply apparatus 9. In this chucked position the tailstock 24 drive is shut off so that the tailstock 24 retains its position. Since the tailstock 24 contains no turning elements, the workpiece 8 is chucked so as to be nonrotating in this situation. Now the machining of the workpiece by means of a rotating tool can start. The cutting tool is rotated and fed by the drilling tube 6 via the headstock 3. On the tailstock side, the workpiece 8 is seated in a so called lantern (cage) 28 known per se while the drilling tube 6 is chucked on the headstock side in a chuck 27. The fastening connections for chuck and lantern are identical and standardized. Now, if machining is to be performed on the rotating workpiece, all that is necessary is to exchange chuck 27 and lantern 28 and to turn the coolant supply apparatus 9 so that the workpiece seating devices faces headstock 3. The chuck 27 is then on the tailstock 24 and the lantern 28 on the headstock 3. The workpiece is now chucked by moving the headstock 3 by means of the feed motor 5 in the same manner as already described above. Since the workpiece seating device 29 is rotatably mounted in the coolant supply apparatus 9, the workpiece 8 can now be rotated by the headstock 3. The tailstock 24 now takes care of the tool feed motion required.

In a machine of this design the advantages of the stationary coolant supply apparatus as already described in the older DE-P 29 15 381.9 are retained despite the expanded field of application. Beyond this, only one main drive is required, namely the one for the headstock 3, instead of the two main drives needed heretofore. Two feed drives are required according to the state of the art as is the case with a machine according to the present invention. But since, according to the state of the art, the coolant supply apparatus had to be equipped with a feed drive, it was necessary in conventional machines to use two different types of feed drives. This increases the cost of keeping a spare parts inventory and the production costs. In a deep drilling machine according to the invention, identical feed drives can be used, reducing production and inventory costs correspondingly. If, beyond this, the coolant supply apparatus is allowed, as described, to swing about a center position against a preload, the required and identical feed drives can be further simplified in design because the elastic member for the absorption of thermal expansion of the workpiece can be obviated. Consequently, rigid feed drives can be utilized.

It would be understood by those skilled in the art and familiarized with the instant disclosure that variations in details of construction may be made without departing from the spirit of the invention which is to be broadly construed, within the scope of the appended claims.

Having thus described my invention, what I claim as new and desire to secure by Letters Patent of the United States is:

1. A deep drilling machine comprising, in combination, an elongate base, a headstock at one end of said base, a tailstock at the other end of said base, chuck means on said headstock, drive means on said headstock for rotating said chuck means about an axis parallel to said base, feed drive means interposed between each of said headstock and said tailstock and said base for independently shifting said headstock and tailstock axially of said base, a coolant supply apparatus mounted on said base at a generally central position thereon, a workpiece seating device mounted on said coolant supply apparatus for rotation about an axis coincident with the axis of rotation of said chuck means, and mounting means interposed between said workpiece seating device and said base, said mounting means including a pivot for selectively positioning said seating device between said coolant supply apparatus and said tailstock on the one hand and said coolant supply apparatus and said headstock on the other hand, said coolant supply apparatus and workpiece seating apparatus being mounted to be shiftable in the direction of the axis of said chuck means, the combination including preload means opposing shifting movement of said seating device.

2. A deep drilling machine comprising, in combination, an elongate base, a headstock at one end of said base, a tailstock at the other end of said base, chuck means on said headstock, drive means on said headstock for rotating said chuck means about an axis parallel to said base, feed drive means interposed between each of said headstock and said tailstock and said base for independently shifting said headstock and tailstock axially of said base, a coolant supply apparatus mounted on said base at a generally central position thereon, a workpiece seating device mounted on said coolant supply apparatus for rotation about an axis coincident with the axis of rotation of said chuck means, and mounting means interposed between said workpiece seating device and said base, said mounting means including a pivot member interposed between said coolant supply apparatus and said base, said pivot member permitting said coolant supply means to be shifted 180° relative to said base whereby said workpiece seating device selectively faces said headstock or said tailstock, said seating device being in fixed position relative to said coolant supply apparatus, said coolant supply apparatus and workpiece seating device being mounted to be shiftable in the direction of the axis of said chuck means; the combination including preload means opposing shifting movement of said seating device.

3. A deep drilling machine comprising, in combination, an elongate base, a headstock at one end of said base, a tailstock at the other end of said base, chuck means on said headstock, rotatable drive means on said headstock for rotating said chuck means about an axis parallel to said base, said headstock drive means comprising the sole means for driven rotation, feed drive means interposed between each of said headstock and said tailstock and said base for independently shifting said headstock and tailstock axially of said base, a coolant supply apparatus mounted in fixed position along said base at a generally central position thereon, a workpiece seating device mounted on said coolant supply apparatus for rotation about an axis coincident with the axis of rotation of said chuck means, and mounting means interposed between said workpiece seating device and said base for selectively positioning said seating device between said coolant supply apparatus and said tailstock on the one hand and said coolant supply apparatus and said headstock on the other hand.

4. Apparatus in accordance with claim 3 wherein said mounting means comprises a pivot member interposed between said coolant supply apparatus and said base, said pivot member permitting said coolant supply means to be shifted 180° relative to said base, whereby said workpiece seating device selectively faces said headstock or said tailstock, said seating device being in fixed position relative to said coolant supply apparatus.

* * * * *